United States Patent
Wallman et al.

Patent Number: 5,715,677
Date of Patent: Feb. 10, 1998

[54] DIESEL $NO_x$ REDUCTION BY PLASMA-REGENERATED ABSORBEND BEDS

[75] Inventors: P. Henrik Wallman, Berkeley; George E. Vogtlin, Fremont, both of Calif.

[73] Assignee: The Regents Of The University Of California, Oakland, Calif.

[21] Appl. No.: 748,081

[22] Filed: Nov. 13, 1996

[51] Int. Cl.$^6$ .................................................. F01N 3/02
[52] U.S. Cl. ........................... 60/274; 60/275; 60/286; 60/295; 60/297
[58] Field of Search .............. 60/274, 275, 286, 60/288, 295, 297

[56] References Cited

U.S. PATENT DOCUMENTS

| | | | |
|---|---|---|---|
| 5,085,049 | 2/1992 | Rim et al. | 60/274 |
| 5,419,123 | 5/1995 | Masters | 60/274 |

FOREIGN PATENT DOCUMENTS

| | | | |
|---|---|---|---|
| 57-2413 | 1/1982 | Japan | 60/297 |
| 63-268911 | 11/1988 | Japan | 60/275 |

OTHER PUBLICATIONS

UCRL-JC-114931, "Application of Pulsed Plasma $NO_x$ Reduction to Diesel Engine Exhaust", P.H. Wallman et al., Oct. 11, 1993.

Alvin B. Sites et al., "Selective Catalytic Reduction of $NO_x$ in the Presence of Oxygen", Ind. Eng. Chem. Res. 1994, 33, 2259–2264.

UCRL-JC-121974, "Nonthermal Aftertreatment of Diesel Engine Exhaust", P.H. Wallman et al., Sep. 22, 1995.

*Primary Examiner*—Tony M. Argenbright
*Attorney, Agent, or Firm*—Henry P. Sartorio; L. E. Carnahan

[57] ABSTRACT

Reduction of $NO_x$ from diesel engine exhaust by use of plasma-regenerated absorbent beds. This involves a process for the reduction of $NO_x$ and particulates from diesel engines by first absorbing $NO_x$ onto a solid absorbent bed that simultaneously acts as a physical trap for the particulate matter, and second regenerating said solid absorbent by pulsed plasma decomposition of absorbed $NO_x$ followed by air oxidation of trapped particulate matter. The absorbent bed may utilize all metal oxides, but the capacity and the kinetics of absorption and desorption vary between different materials, and thus the composition of the absorbent bed is preferably a material which enables the combination of $NO_x$ absorption capability with catalytic activity for oxidation of hydrocarbons. Thus, naturally occurring or synthetically prepared materials may be utilized, particularly those having $NO_x$ absorption properties up to temperatures around 400° C. which is in the area of diesel engine exhaust temperatures.

19 Claims, 1 Drawing Sheet

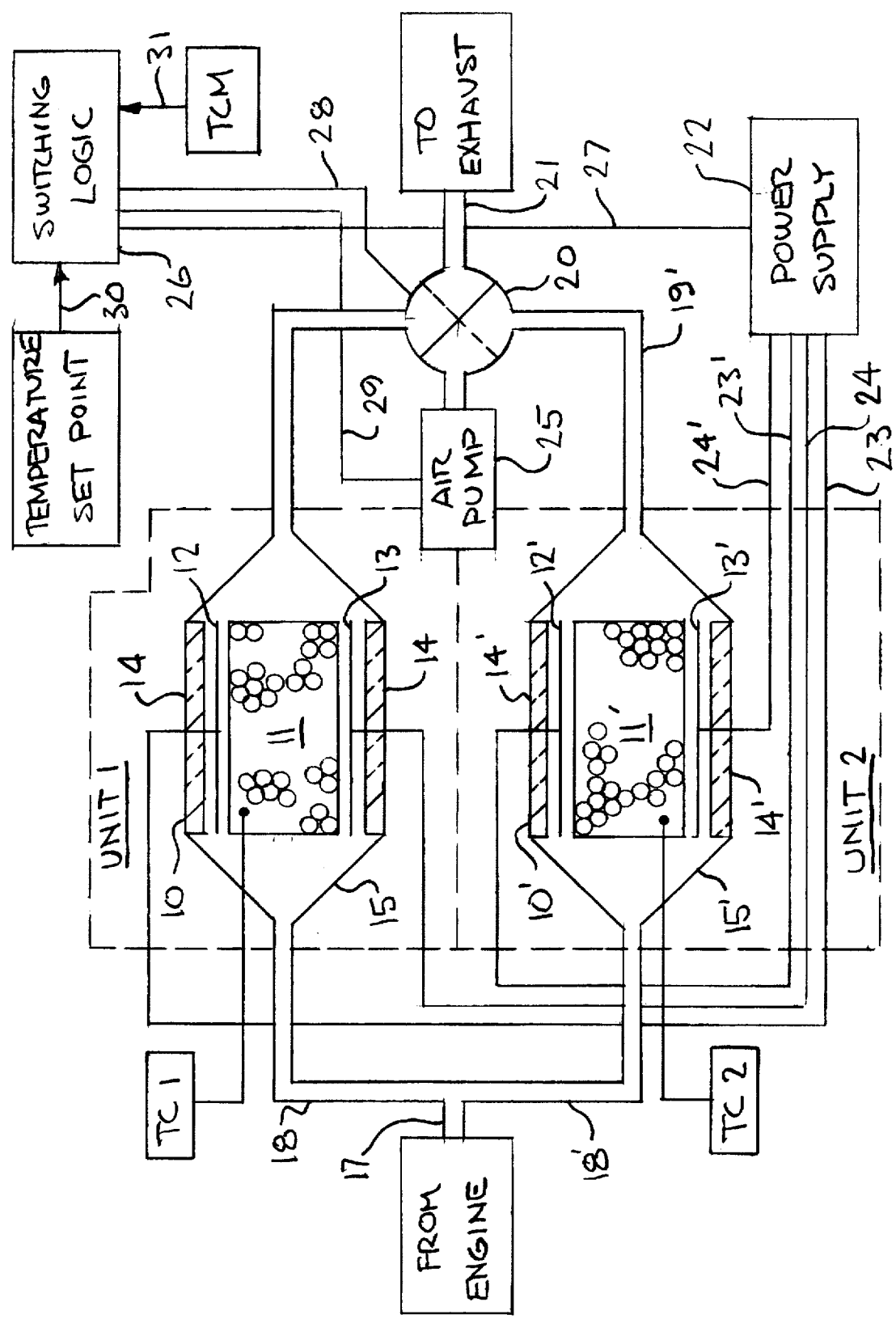

DIESEL NO$_x$ REDUCTION BY PLASMA-REGENERATED ABSORBEND BEDS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the reduction of NO$_x$ in diesel engine exhaust, particularly to a process for the reduction of NO$_x$ and particulates from diesel engines, and more particular to such a process which involves absorbing the NO$_x$ and trapping the particulates, and then regenerating the absorbent material by pulsed plasma decomposition of absorbed NO$_x$ followed by air oxidation of the trapped particulate matter.

Exhaust gases from diesel engines contain more NO$_x$ than will be allowed by emission standards taking effect in the near future. The standard three-way catalytic converter, currently used for gasoline engines, is inefficient because of the large excess oxygen in the exhaust from diesel engines; thus being a result of the lean combustion utilizing in diesel engines. Catalysts that decompose diesel exhaust NO$_x$ by reaction with a chemical additive such as ammonia, urea, cyanuric acid, etc. have been developed but require a reservoir of these chemicals. For mobile applications such a reservoir is impractical. Recently, efforts have been directed to the use of pulsed plasma for NO$_x$ reduction in diesel engine exhaust, as described in document UCRL-JC-114931 entitled "Application of Pulsed Plasma NO$_x$ Reduction to Diesel Engine Exhaust" by P. H. Wallman et al. dated Oct. 11, 1993.

The present invention eliminates the need for a chemical additive and the associated reservoir, and accomplishes are NO$_x$ reduction task by means of passive absorbent beds that are regenerated from time to time by electrical discharges. An added benefit of the present invention is the removal of all hydrocarbons from the exhaust, be they gaseous or particulate in nature. The invention involves a process which includes absorbing the NO$_x$ and trapping the particulate matter, and regenerating the absorbing material by pulsed plasma decomposition of absorbed NO$_x$, followed by air oxidation of the trapped particulate matter. The process of this invention is applicable to diesel engines (stationary or mobile), and to lean-burn gasoline engines.

SUMMARY OF THE INVENTION

It is an object of the invention to reduce NO$_x$ in the exhaust of internal combustion engines.

A further object of the invention is to provide a process for the reduction of NO$_x$ in diesel and lean-burn gasoline engines.

A further object of the invention is to provide for diesel engine exhaust NO$_x$ reduction using plasma-regenerated absorbent beds.

Another object of the invention is to provide an NO$_x$ reduction process using alternating absorbent beds, wherein one bed is rejuvenated while the other bed is absorbing NO$_x$ in engine exhaust.

Another object of the invention is to provide a process for the reduction of NO$_x$ and particulates from diesel engines by absorbing the NO$_x$ in a solid absorbent material and simultaneously trapping the particulates, whereafter the absorbent material is regenerated by pulsed plasma decomposition of absorbed NO$_x$ and then air oxidation of the trapped particulates.

Another object of the invention is to enable reduction in NO$_x$ and particulates from engines by using alternating solid absorbent beds, and while one bed is in use the other bed is regenerated by pulsed plasma and air oxidation, and providing a means for switching from bed to bed.

Other objects and advantages of the invention will become apparent from the following description and accompanying drawings. Basically, the invention involves diesel NO$_x$ reduction by plasma-regenerated absorbent beds. The invention eliminates the need for a chemical additive and accomplishes the NO$_x$ reduction by means of a passive absorbent bed that is regenerated from time to time by electrical discharges. In addition, the invention provides for the removal of all hydrocarbons from the exhaust be they gaseous or particulate in nature.

The apparatus of the invention comprises a pair of solid absorbent bed connected to the engine, each provided with electrodes to produce a plasma discharge across the bed, a power supply connected to the electrodes, a three way valve connected to the outlets from each of the beds, an air pump, and a control/switching system for controlling power to selected electrodes, movement of the three way valve, and activation of the air pump. By movement of the three-way valve one bed is placed in a use made and the other in a regeneration mode.

The process of the invention basically involves absorbing NO$_x$ onto one of the solid absorbent beds that simultaneously acts as a physical trap for the particulate matter, and second regenerating said solid absorbent by pulsed plasma decomposition of absorbed NO$_x$, followed by air oxidation of trapped particulate matter. The process and apparatus can be effectively utilized for diesel engines, stationary and mobile, as well as lean-burn gasoline engines.

BRIEF DESCRIPTION OF THE DRAWINGS

The accompanying drawing, which is incorporated into and forms part of the disclosure, illustrates an embodiment of the invention and, together with the description, serves to explain the principles of the invention.

The single Figure schematically illustrates an embodiment of an engine exhaust cleanup device for NO$_x$ reduction by plasma-regenerated absorbent beds.

DETAILED DESCRIPTION OF THE INVENTION

The present invention is directed to a process and apparatus for NO$_x$ reduction in diesel and lean-burn gasoline engines by plasma-regenerated absorbent beds. The apparatus includes two absorber/catalyst beds or units that alternate between in-line service and off-line regeneration. The time periods for switching the two units may be determined by fixed engine on time, or by a function of the integrated engine load, or may be determined by NO$_x$ or particulate breakthrough if the system were augmented by on-line NO$_x$ or particulate sensors downstream of the in-service bed. Control of the switching between the two units is handled by a switching logic built into a microprocessor. Mechanical switching actuation occurs by changing the position of a three-way valve located downstream of the absorbent beds or units. Regeneration of the solid absorbent beds is carried out by pulsed plasma decomposition of absorbed NO$_x$ followed by air oxidation of trapped particulate matter.

Pulsed plasma $NO_x$ reduction is known as exemplified by above-referenced document UCRL-JC-114931. The pulsed plasma decomposition is carried out by electrodes located in each of the beds or units, and air oxidation is carried out using an air pump which drives air through the bed being regenerated to enable burn-off of the particulate matter.

Regeneration of either of the two solid absorbent beds or units comprises two distinct functions: First, the pulsed plasma discharge is turned on without any air or exhaust gas admitted to the unit undergoing regeneration, wherein the pulsed plasma both heats the absorber bed and decomposes the desorbing $NO_x$ into $N_2$ and $O_2$. As the temperature of the bed rises, the particulate matter trapped between the granules of the absorber material begins to react with the $O_2$ formed from the decomposition of $NO_x$. Removal of this $O_2$ further speeds up the decomposition of desorbing $NO_x$. The product gases consisting of $N_2$, $CO_2$, $H_2O$, $CO$, and some $O_2$ flow "backwards" into the other bed or unit where the absorbent/catalyst bed oxides CO to $CO_2$. Second, at a set temperature by which the desorption of $NO_x$ is complete (such as 700° C. for most absorbent materials) the pulsed plasma is turned off and an air pump is turned on. This pump drives a small flow of air through the bed under regeneration and accomplishes complete burn-off of remaining particulate matter. The product gases composed of $CO_2$, $H_2O$, and CO again enter the other absorber bed or unit. After a set time the air pump shuts off and the unit under regeneration is ready for in-line service during the next cycle. This operation will become more apparent from the detailed description of the apparatus set forth herein below.

Almost all metal oxides have $NO_x$ absorption capability, but the capacity and the kinetics of absorption and desorption vary between different materials. Naturally occurring materials such as limestone or dolomite can be used but specially prepared materials have generally better performance. Particularly important is the combination of $NO_x$ absorption capability with catalytic activity for oxidation of hydrocarbons (these two functions are related because the catalytic activity leads to oxidation of the primary NO to $NO_2$ which absorbs much more readily). Noble metals, such as Pt or Pd have these two desirable characteristics implying that the existing three-way catalyst can be used in the process of this invention. Also, less expensive oxides of transition metals such as iron, cobolt, nickel, copper, and zink may be used. Also, the commercially available catalyst materials, such as vanadia ($V_2O_5$) supported on titania or alumina or silica can be used. Several zeolites, such as ZSM-5 or Cu-exchanged ZSM-5 or H-mordenite can be used. Naturally occurring or synthetically prepared perovskites, such as $CatiO_3$, $FeTiO_3$, $SrTiO_3$, or $BaTiO_3$ have shown to have excellent $NO_x$ absorption properties up to temperatures around 400° C. which fits well with diesel engine exhaust temperatures. A description of the various catalyst materials that have been proposed for $NO_x$ absorption can be found in the chemical engineering literature, see A. B. Stiles et al., "Selective Catalytic Reduction of $NO_x$ in the Presence of Oxygen", Ind. Eng. Chem. Res. 1994, 33, 2259–2264.

Regardless of the chemical composition of the absorbent bed, bead size of the absorbent is a trade off between particulate filtering efficiency and back pressure considerations. A particle size on the order of 5–10 mm is probably optimal because absolute trapping of exhaust particles is not required, only so-called in-bed filtration is required which is a slowdown of the moving of fine particulate matter through the bed, thanks to multiple impacts between the fine particulate and the larger bed particles. With in-bed filtration the absorbent bed eventually becomes saturated with fine solids at which point break-through of fine material occurs at the back end of the bed. This is in many ways analogous to the breakthrough that occurs for $NO_x$ when the $NO_x$ holding capacity of the bed is exceeded. In typical applications $NO_x$ breakthrough would occur first because diesel exhaust contains 10 times as much $NO_x$ as particulate matter.

An embodiment of an apparatus for $NO_x$ reduction by plasma-regenerated absorbent beds is schematically illustrated in the single Figure. As shown, the apparatus comprises a pair of units generally indicated at Unit 1 and Unit 2, each composed of a housing 10 and 10' having therein a bed of granular (solid) absorbent/catalyst material 11 and 11', a pair of electrodes 12–13 and 12'–13' surrounded by a layer insulation 14 and 14'. Housings 10 and 10' includes tapered inlets 15 and 15' and tapered outlets 16 and 16' with tapered inlets 15 and 15' being connected to an engine, as indicated by legend, via a common pipe 17 and branch pipes 18 and 18'. The tapered outlets 16 and 16' of housings 10 and 10' are connected via pipes 19 and 19' to a valve assembly, such as a three-way valve 20, having an outlet pipe 21 connected to an exhaust system, as indicated by legend. A power supply 22 is connected by two sets of electrical leads 23–24 and 23'–24' to electrodes 12–13 and 12'–13', respectively. A pair of thermocouples TC1 and TC2 are mounted in units 1 and 2. Three-way valve, while having three positions, one position being neutral, is illustrated by legend Position 1 in solid line and by legend Position 2 in dashed line, whereby outlet pipe 21 is connected to pipe 19 when the valve 20 is in Position 1 and to pipe 19' when in Position 2. An air pump 25 is mounted to direct air into either pipe 19 or pipe 19' depending on the position of valve 20. Control of the power supply 22, three-way valve 20, and air pump 25 is carried out by a microprocessor system which includes a switching logic indicated at 26, as indicated by respective dash lines 27, 28 and 29. The switching logic 26 is connected so as to be activated by temperature set point and on-stream time as indicated by legend and arrow 30; and by thermocouple measurements (TCM) as indicated by legend and arrow 31, which are received from units 1 and 2. While two units 1 and 2 have been used in this embodiment, additional units may be used.

In operation, power from power supply 22 to electrodes 12–13 of unit 1 is off as indicated by legend "Unit 1 off"; and power from power supply 22 to electrodes 12'–13' of unit 2 is on as indicated by legend "Unit 2 on", which illustrates that unit I although electrically in the off-mode is in an on-line or on-stream mode receiving exhaust from the engine, while unit 2 is electrically in the on-mode but in an off-line, off-stream or regeneration mode, whereby exhaust gases flow through pipe 17, branch pipe 18', unit 1, pipe 19, valve 20 and exhaust pipe 21 to an exhaust system. The electrical on or off-modes are opposite the gas flow on and off-modes and function to regenerate the units 1 and 2 when in the off stream or flow mode. As the engine exhaust flows through unit I the bed 11 of granular (solid) absorbent/catalyst material absorbs $NO_x$ and simultaneously acts as a physical trap for any particulate matter in the exhaust. While $NO_x$ and particulate matter are absorbed or trapped in the bed 11 of unit 1, bed 11' of unit 2 is being regenerated by pulsed plasma decomposition of absorbed $NO_x$ followed by air oxidation of trapped particulate matter. As described in greater detail above, the pulsed plasma decomposition is carried out by producing electrical discharges between electrodes 12' and 13', and at a set temperature by which the desorption of $NO_x$ in bed 11' is complete, the pulsed plasma is turned off via a control signal on lead 27 to the power supply 22, and the air pump 25 is turned on via control signal on lead 29 from the switching logic 26. Pump 25 is maintained on until a complete burn-off of remaining particulate matter is accomplished. Thus, unit 2 is now regenerated and ready for on-line use, as controlled by the three-way valve 20 via a signal in lead 28 from the switching logic 26. As pointed out above, alternating between units 1 and 2 may be controlled, for example, by a fixed engine on-time, a function of the integrated engine load, by $NO_x$ or particulate breakthrough, or other means programmed into the microprocessor system.

The process of the invention basically comprises absorbing $NO_x$ onto a solid absorbent bed that simultaneously acts as physical trap for the particulate matter in the exhaust, and regenerating the solid absorbent bed by pulsed plasma decomposition of absorbed $NO_x$ followed by air oxidation of trapped particulate matter. The following sets forth an example of a specific operational sequence for carrying out this process:

1. Forming two beds of granular absorbent/catalyst materials composed, for example, of PM25 titania having a bead size of 5 mm, 2. Providing each of the beds with electrodes and a power supply for producing a pulsed plasma therein having a voltage of 25 kV, with the pulses being 500 per second and having a time duration of 100 ns, for heating the beds to a temperature in the range of 300°–900° C., 3. Providing insulation about the beds, 4. Providing means for directing exhaust from an engine into and through each of the beds, 5. Connecting each of the beds to valve mechanism, 6. Providing means for directing exhaust from the valve mechanism, 7. Providing means for directing air into the valve mechanism, 8. Providing means for controlling the power supply, the valve mechanism, and the air supply means, 9. Activating the valve mechanism so that exhaust from the engine passes through a first of the beds wherein $NO_x$ is absorbed and particulates are trapped therein, 10. At a predetermined point, activating the valve mechanism to direct the exhaust through a second of the beds for absorbing $NO_x$ and trapping particulates in the exhaust, 11. Activating the power supply and electrodes in the first bed to produce a pulsed plasma therein causing heating of the bed and decomposition of absorbed $NO_x$, 12. At a temperature, such as 700° C., by which the desorption of $NO_x$ is complete, deactivating the power supply and the electrode in the first bed, 13. Activating the air directing means for providing air flow, at a gauge pressure of 0.1 to 0.5 bar and flow rate of 10 to 100 liter/second, through the first bed for air oxidation and complete burn-off of remaining particulate matter (hydrocarbons), 14. Deactivating the air directing means, whereby the first bed is regenerated, and 15. Alternately regenerating one bed while the other bed is in-line mode for the removal of $NO_x$ and particulate matter from engine exhaust.

It has thus been shown that the present invention enables $NO_x$ reduction by plasma-regeneration as well as the removal of exhaust particulate matter, such as hydrocarbons, from diesel or lean-burn gasoline engines.

While a particular embodiment, materials, parameters, etc. have been set for to provide an example of the invention and explain the principles, thereof, such is not intended to be limiting. Modifications and changes may become apparent to those skilled in the art, and it is intended that the invention be limited only by the scope of the appended claims.

The invention claimed is:

1. A process for removing $NO_x$ and particulates from an engine exhaust, comprising:

providing a plurality of beds containing absorbent/catalyst material;

providing means for connecting the beds with engine exhaust, and providing a valve mechanism connected to the beds;

providing means for producing a pulsed plasma in the beds;

providing means for supplying air to the beds;

providing means for activating the valve mechanism for directing engine exhaust through one of the plurality of beds;

providing means for activating and controlling the pulsed plasma in another of the plurality of beds; and providing means for activating and controlling the air supplying means;

whereby the other of the plurality of beds is regenerated while engine exhaust passes through the one of the plurality of beds.

2. The process of claim 1, wherein forming of the plurality of beds includes selecting the absorbent/catalyst material from the group consisting of vanadia, titania, alumina, silica, and silica base containing a transition metal oxide or noble metal.

3. The process of claim 1, wherein the absorbent/catalyst material is granular having a bead size in the range of 5 to 10 mm.

4. The process of claim 1, wherein the pulsed plasma heats the bed to a temperature in the range of 300° to 900° C.

5. The process of claim 1, wherein the air is supplied at a pressure of 0.1 to 0.5 bar and at a flow rate of 10 to 100 liter/second.

6. The process of claim 1, wherein providing means for producing a pulsed plasma in the beds is carried out by providing spaced electrodes adjacent the absorbent/catalyst material and providing a controlled power supply for producing an electrical discharge between the electrodes.

7. The process of claim 1, wherein the valve mechanism is formed to comprise a valve assembly having a plurality of positions and an exhaust, each position being adapted to connect the exhaust of the valve assembly with one of the plurality of beds.

8. The process of claim 1, wherein activating the valve mechanism, activating and controlling the pulsed plasma, and activating and controlling the air supplying means is carried out by a system including a switching logic.

9. The process of claim 8, wherein the switching logic is provided with signals representing at least one of the group consisting of temperature of the beds, on-stream time, $NO_x$ concentration, and particulates in the bed.

10. A process for the reduction of $NO_x$ and particulates from exhaust of a diesel or lean-burn gasoline engine, comprising:

absorbing $NO_x$ onto a solid absorbent bed;

simultaneously trapping particulate matter in the bed;

regenerating the solid absorbent bed by pulsed plasma decomposition of absorbed $NO_x$; and burn-off of remaining trapped particulate matter by air oxidation.

11. The process of claim 10, additionally including forming the solid absorbent bed from absorbent/catalyst material selected from the group consisting of iron oxide, ilmenite, perovskite, and calcite.

12. The process of claim 10, additionally including providing the bed with spaced electrodes for producing the pulsed plasma by electrical discharge between the electrodes.

13. The process of claim 10, wherein the air oxidation of the particulate matter is carried out by supplying air to the bed following heating of the bed by the pulsed plasma.

14. An apparatus for reducing $NO_x$ and particulates in an engine exhaust, comprising:
   a plurality of solid absorbent/catalyst material beds, each bed having an inlet and an outlet;
   a valve assembly connected to said bed outlets and to an exhaust;
   said bed inlets being adapted to being connected to an engine exhaust system;
   a plurality of electrodes located in each of said beds;
   means for supplying electrical power to said electrodes for producing an electrical discharge therebetween;
   means for supplying air to said valve assembly.; and
   means for controlling said power supplying means;
   said air supplying means, and said valve assembly;
   whereby engine exhaust through said plurality of beds is controlled by said valve assembly, such that at least one of said plurality of beds is absorbing $NO_x$ and trapping particulate matter, while at least another of said plurality of beds is being regenerated.

15. The apparatus of claim 14, wherein the absorbent/catalyst material beds are composed of an absorbent selected from the group consisting of oxides of iron, cobalt, nickel, copper and zink and a catalyst selected from the group consisting of vanadia, titania, alumina and silica.

16. The apparatus of claim 14, wherein said means for supplying electrical power to said electrodes includes a power supply capable of heating a bed to a temperature of 300° to 900° C.

17. The apparatus of claim 14, wherein said valve assembly is composed of a multi-position valve, one position of said valve being connected to one of said plurality of beds, whereby activation of said valve may connect one of said plurality of beds with the exhaust of said valve and block connection of another of said plurality of beds from the exhaust of said valve.

18. The apparatus of claim 14, wherein said means for controlling includes a system having a switching logic.

19. The apparatus of claim 14, whereby said plurality of beds consist of two beds, and wherein said valve assembly comprises a three-way valve, whereby activation of said three-way valve positions one of said two beds in an on-line mode to receive engine exhaust, and positions the other said two beds in a regeneration mode.

* * * * *